(12) United States Patent
Drake et al.

(10) Patent No.: US 8,084,166 B2
(45) Date of Patent: Dec. 27, 2011

(54) ENHANCED FUEL DELIVERY FOR DIRECT METHANOL FUEL CELLS

(75) Inventors: Javit A. Drake, Waltham, MA (US); Andrew G. Gilicinski, Westborough, MA (US); Gordon G. Guay, Chelmsford, MA (US); Leslie J. Pinnell, Framingham, MA (US)

(73) Assignee: The Gillette Company, Boston, MA (US)

( * ) Notice: Subject to any disclaimer, the term of this patent is extended or adjusted under 35 U.S.C. 154(b) by 1922 days.

(21) Appl. No.: 10/664,822

(22) Filed: Sep. 16, 2003

(65) Prior Publication Data

US 2005/0058874 A1    Mar. 17, 2005

(51) Int. Cl.
    *H01M 2/00* (2006.01)
(52) U.S. Cl. .................. 429/515; 429/506; 429/513
(58) Field of Classification Search .................. None
    See application file for complete search history.

(56) References Cited

U.S. PATENT DOCUMENTS

| | | | |
|---|---|---|---|
| 5,069,793 A | 12/1991 | Kaschemekat et al. |
| 5,354,474 A | 10/1994 | LaPack et al. |
| 5,432,023 A | 7/1995 | Yamada et al. |
| 5,681,467 A | 10/1997 | Solie et al. |
| 6,207,369 B1 * | 3/2001 | Wohlstadter et al. ............ 435/6 |
| 6,211,643 B1 | 4/2001 | Kagatani |
| 6,444,337 B1 | 9/2002 | Iyer |
| 6,447,941 B1 | 9/2002 | Tomimatsu et al. |
| 6,460,733 B2 | 10/2002 | Acker et al. |
| 6,506,513 B1 | 1/2003 | Yonetsu et al. |
| 6,645,651 B2 * | 11/2003 | Hockaday et al. ............ 429/19 |
| 2001/0049045 A1 | 12/2001 | Hockaday et al. |
| 2002/0064698 A1 | 5/2002 | Ren |
| 2002/0182459 A1 | 12/2002 | Hockaday et al. |
| 2002/0197522 A1 | 12/2002 | Lawrence et al. |
| 2003/0049510 A1 | 3/2003 | Ren |
| 2003/0059660 A1 | 3/2003 | Kamo et al. |
| 2003/0082416 A1 | 5/2003 | Bullock et al. |

(Continued)

FOREIGN PATENT DOCUMENTS

| | | |
|---|---|---|
| EP | 0 457 921 A1 | 11/1991 |
| WO | WO 02/008699 A1 | 10/2002 |
| WO | WO 03/043112 | 5/2003 |

OTHER PUBLICATIONS

Mozsgai et al., "A Silicon Microfabricated Direct Formic Acid Fuel Cell," Transducers '03, The 12th Annual Conference on Solid State Sensors, Actuators and Microsystems, Boston, Jun. 8-12, 2003.

(Continued)

*Primary Examiner* — R Hodge
(74) *Attorney, Agent, or Firm* — Fish & Richardson P.C.

(57) ABSTRACT

An arrangement for a direct methanol fuel cell includes a fuel cartridge that supplies a source of fuel to the direct methanol fuel cell. The fuel cartridge has a surface area enhanced planar vaporization membrane residing in the fuel cartridge. The arrangement also includes a fuel reservoir that receives fuel from the fuel cartridge, the fuel reservoir arranged to deliver fuel to the fuel cell. The fuel reservoir also including a surface area enhanced planar vaporization membrane residing in the fuel reservoir. The combination of the surface area enhanced planar vaporization membranes residing in the fuel cartridge and reservoir provides a dual stage vaporization of fuel to the fuel cell. Other features included are passive or active arrangements to increase the temperature of the fuel or reduce pressure in the fuel container to enhance rate of vaporization.

23 Claims, 14 Drawing Sheets

U.S. PATENT DOCUMENTS

| | | |
|---|---|---|
| 2004/0202904 A1 | 10/2004 | Gore et al. |
| 2004/0209133 A1 | 10/2004 | Hirsch et al. |
| 2004/0253500 A1 | 12/2004 | Bourilkov et al. |
| 2005/0023236 A1 | 2/2005 | Adams et al. |
| 2005/0056641 A1 | 3/2005 | Drake et al. |
| 2005/0058879 A1 | 3/2005 | Guay |
| 2006/0172171 A1 | 8/2006 | Deinzer et al. |

OTHER PUBLICATIONS

Maynard et al., "Miniature fuel cells for portable power: Design considerations and challenges", J. Vac. Sci. Technol. B20(4), pp. 1287-1297, Jul./Aug. 2002.

OA issued in related U.S. Appl. No. 10/664,818, dated Feb. 13, 2006.
OA issued in related U.S. Appl. No. 10/664,818, dated Jun. 2, 2006.
OA issued in related U.S. Appl. No. 10/664,818, dated Nov. 30, 2006.
OA issued in related U.S. Appl. No. 10/664,818, dated Jun. 7, 2007.
OA issued in related U.S. Appl. No. 10/664,818, dated Nov. 15, 2007.
Restriction Requirement issued in related U.S. Appl. No. 10/664,405, dated Jun. 17, 2008.
OA issued in related U.S. Appl. No. 10/664,405, dated Sep. 18, 2008.

* cited by examiner

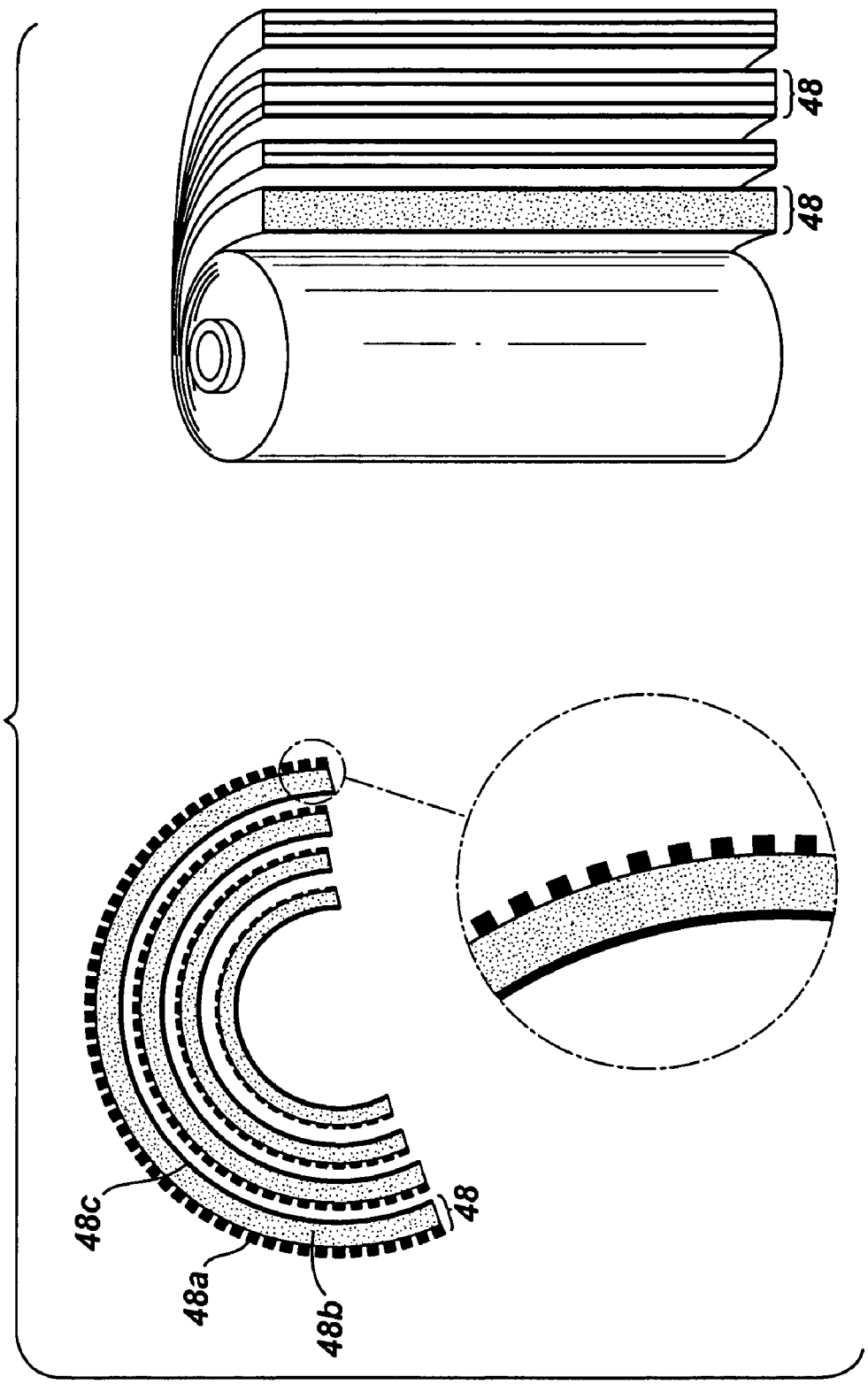

FIG. 2D
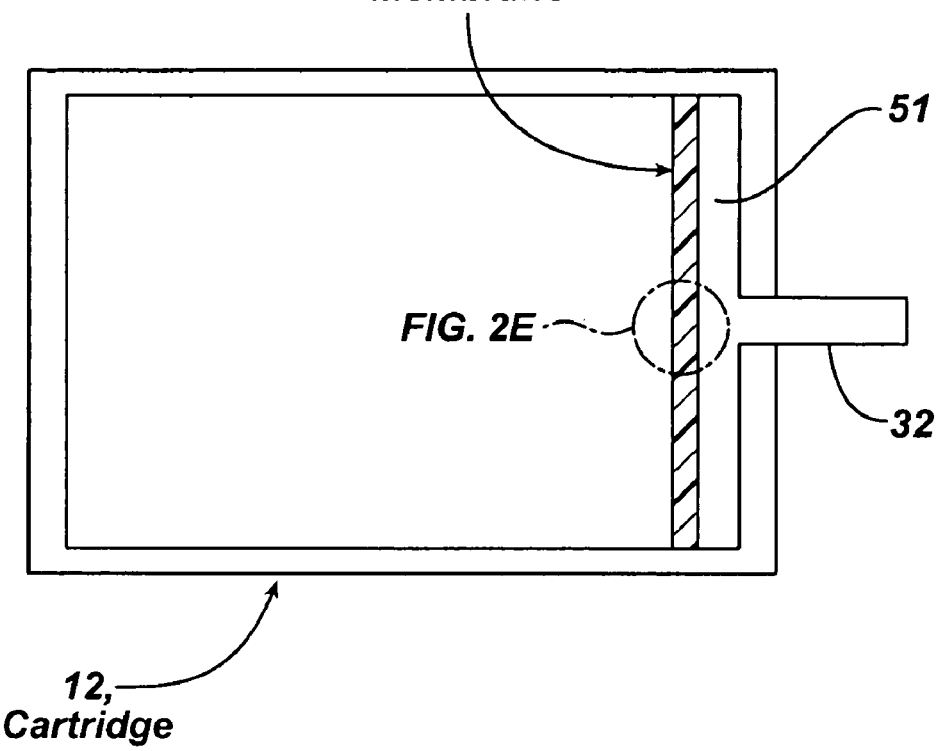
52, Surface Enhanced Membrane
51
FIG. 2E
32
12, Cartridge
FIG. 2E
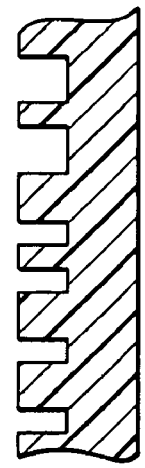

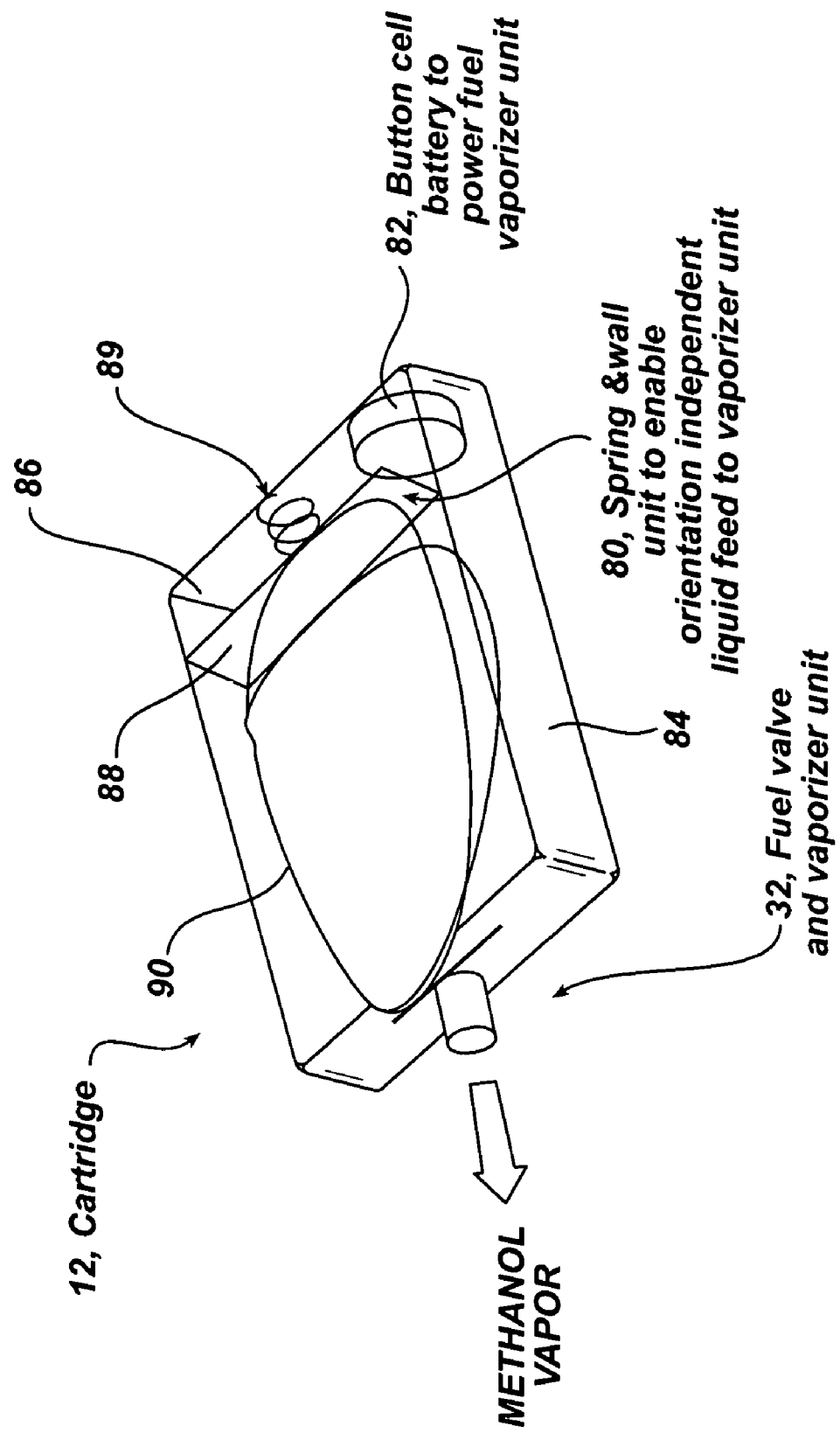

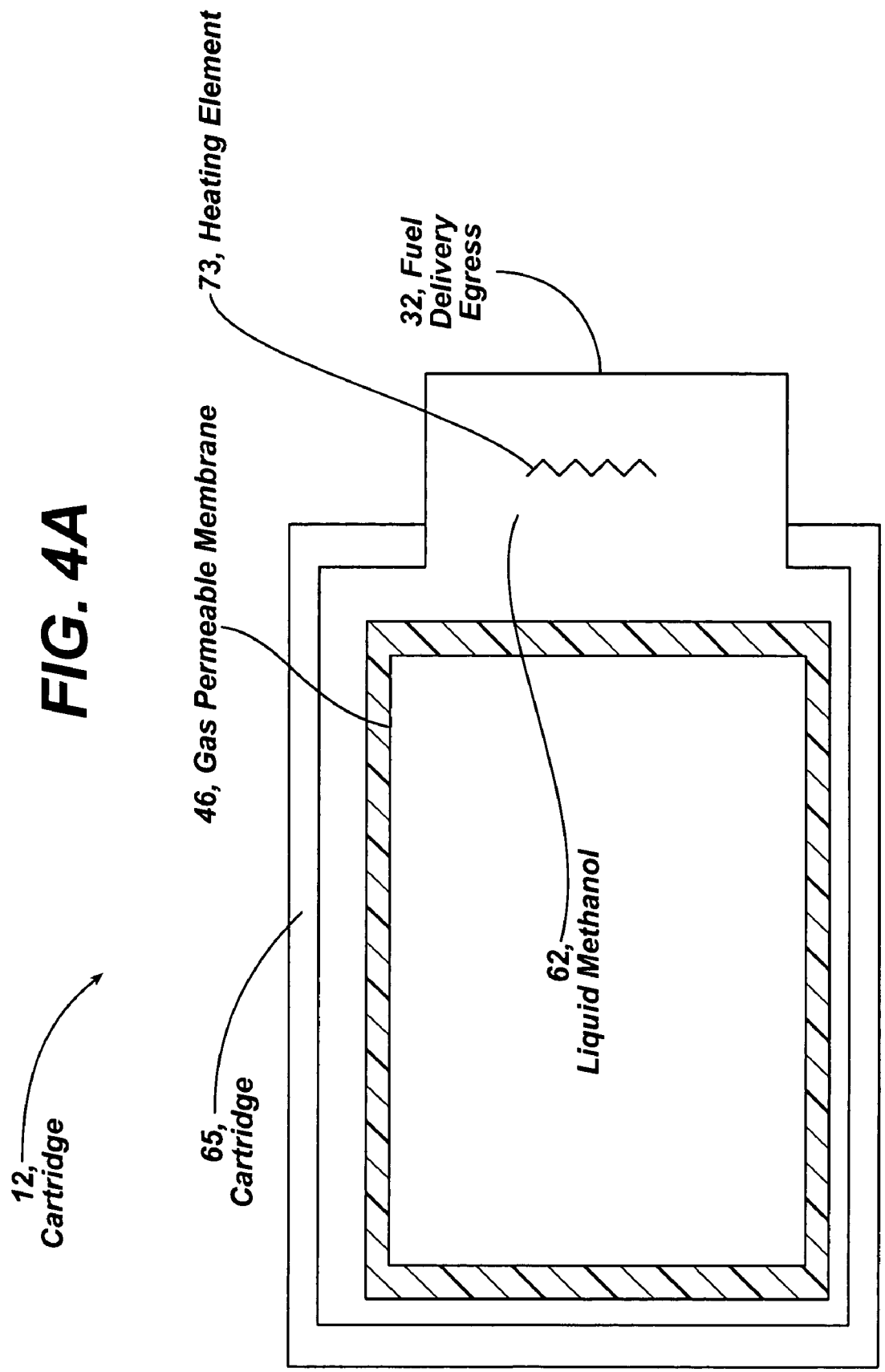

ENHANCED FUEL DELIVERY FOR DIRECT METHANOL FUEL CELLS

BACKGROUND

This invention relates to powering of portable electronic devices.

Portable electronic devices are normally powered with either a primary or a rechargeable battery. Growth in the portable electronic device market, as well as, changes in usage patterns, has provided opportunities for rechargeable sources of power to power an electronic device. While primary batteries have a greater energy density, their internal resistance is larger, and primary batteries are less suitable in high drain electronic devices. Rechargeable batteries can handle large loads but do not have sufficient energy capacity for many applications.

Fuel cells incorporated into power sources for portable devices promise longer runtimes than conventional battery systems, due to the ability to use high-energy content fuels. Several fuel cell technologies are currently under development for commercialization in portable power applications, such as direct methanol fuel cells (DMFC) and hydrogen polymer electrolyte membrane (PEM) fuel cells.

In a DMFC, the fuel is methanol or mixtures of water and methanol. Methanol or methanol mixtures are delivered as a liquid to an anode chamber in a DMFC, where methanol is oxidized as part of the electrochemical conversion of fuel to electricity. An operational challenge in DMFC systems is "methanol crossover" a phenomenon where at above about 3% methanol concentration in the anode chamber, an unacceptably high amount of methanol migrates across a polymer electrolyte membrane and causes both parasitic losses (reducing runtime) and mixed potentials differences at the cathode causing reduced output power.

SUMMARY

Described are embodiments to enhance the rate of fuel vaporization to deliver fuel as a vapor to fuel cells. An enhanced membrane is disposed in a fuel cartridge or fuel reservoir to provide fuel as a vapor. The rate of fuel delivery is proportional to a surface area of the enhanced membrane. This permits compact fuel reservoir or fuel cartridge systems. By providing compact fuel reservoir or fuel cartridge systems vapor phase delivery of methanol fuel can be provided at higher rates to enable higher power DMFC systems.

According to an aspect of the invention, a fuel cartridge supplies a source of fuel to a direct methanol fuel cell. The fuel cartridge includes a housing, a fuel egress port supported by the housing and a surface area enhanced planar vaporization membrane residing in the fuel cartridge.

Other embodiments are within the scope of the claims. The surface area enhanced planar vaporization membrane is a polymer membrane disposed about a substantial portion of an interior of the housing to provide a high surface area membrane. The surface area enhanced planar vaporization membrane is a composite membrane comprised of multiple layers or folds of polymer membrane to increase vapor permeation surface area. The surface area enhanced planar vaporization membrane is a membrane arranged as a series of folds. The surface area enhanced planar vaporization membrane is a polymer membrane provided with macroscopically irregular and/or microscopically roughened membrane surfaces to increase the effective membrane surface area for vaporization. The surface area enhanced planar vaporization membrane spaces a liquid source of oxidizable fuel from a vapor phase of the source of oxidizable fuel. The cartridge contains a liquid source of oxidizable fuel. The liquid source of oxidizable fuel is methanol. The enhanced planar vaporization membrane is comprised of a polymer material selected from the group consisting of polyurethanes, silicones, poly(trimethylsilyl-propyne), polymeric compositions, and composites. The surface area enhanced planar vaporization membrane enhances a delivery rate of methanol in a vapor phase to the egress port for a given cartridge size.

According to an additional aspect of the invention, a fuel cartridge supplies a source of fuel to a direct methanol fuel cell. The fuel cartridge includes a housing, a fuel egress port supported by the housing, and a composite membrane residing in the fuel cartridge. The composite membrane includes a porous substrate, a polymer membrane disposed over a first surface of the porous substrate and a coating of a methanol-impermeable material disposed over an opposite surface of the substrate.

According to an additional aspect of the invention, a composite membrane residing in the fuel cartridge includes a porous substrate, a polymer membrane disposed over a first surface of the porous substrate and a coating of a methanol-impermeable material disposed over an opposite surface of the substrate.

According to an additional aspect of the invention, an arrangement includes a direct methanol fuel cell and a fuel cartridge that supplies a source of fuel to the direct methanol fuel cell. The fuel cartridge includes a housing, a fuel egress port supported by the housing and a surface area enhanced planar vaporization membrane residing in the fuel cartridge. The arrangement also includes a fuel reservoir that receives fuel from the fuel cartridge, the fuel reservoir arranged to deliver fuel to the fuel cell. The fuel reservoir includes a housing and a surface area enhanced planar vaporization membrane residing in the fuel reservoir, which in combination with the surface area enhanced planar vaporization membrane residing in the fuel cartridge provides a dual stage vaporization of fuel to the fuel cell.

According to an additional aspect of the invention, a method of operating an electronic device includes arranging a fuel cartridge to supply a source of fuel to a direct methanol fuel cell, the fuel cartridge including a housing, a fuel egress port supported by the housing, and a composite membrane residing in the fuel cartridge. The composite member including a porous substrate, a polymer membrane disposed over a first surface of the porous substrate, and a coating of a methanol-impermeable material disposed over an opposite surface of the substrate.

Such approaches allow the fuel cell to operate without a need for pumps or other active controls to maintain low methanol activity in the anode. The approach also enables high rates of vapor delivery and thus permits higher power DMFC systems than prior approaches for a specified cell size and geometry.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 2A-2E are diagrams depicting arrangements of polymer membranes in fuel cartridges.

FIG. 4 is a diagram depicting a prismatic fuel cartridge having a bladder and local heating arrangement.

FIG. 4A is a diagram depicting aspects of a valve for the fuel cartridge.

DETAILED DESCRIPTION

Figure 1A:
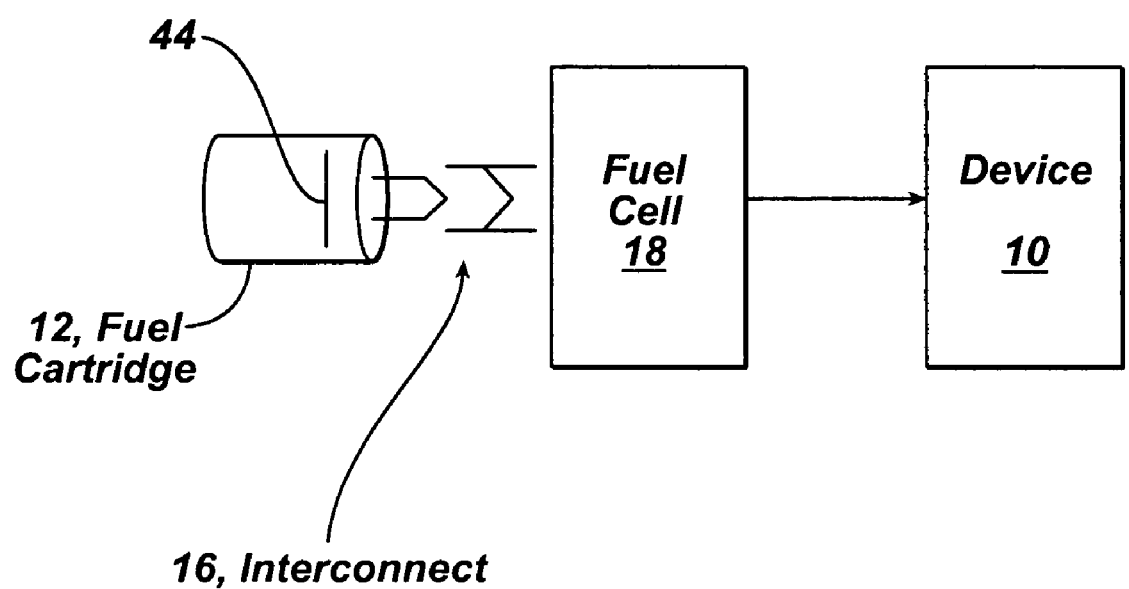
FIGS. 1A and 1B are block diagrams depicting an electronic device powered by a fuel cell.
Figure 1B:
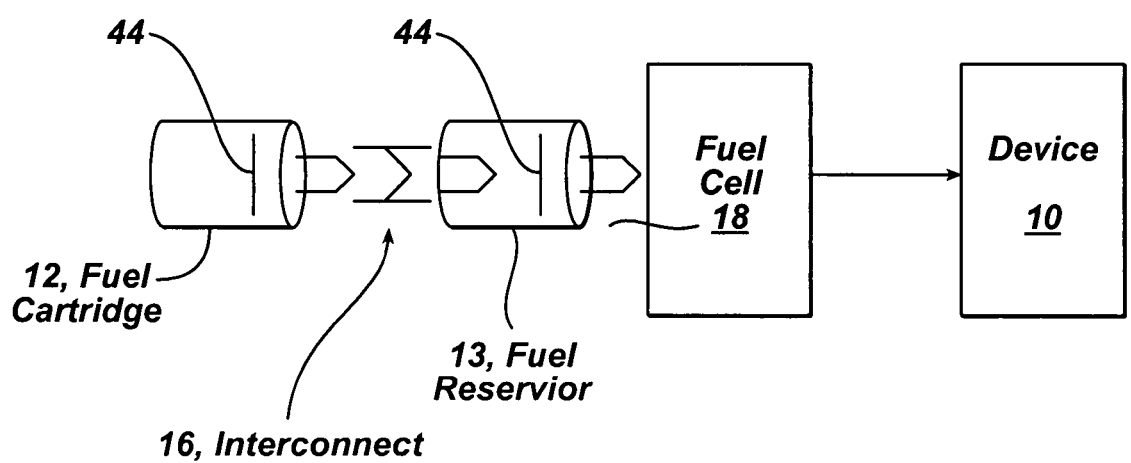

Referring to FIG. 1A, a portable powered, electronic device 10 (hereafter device 10) is shown. The device 10 includes a housing (not shown) having a compartment (not shown) to house an energy source, e.g., a fuel cartridge 12. The device 10 also includes an interconnect 16 to interface a fuel cartridge 12 that supplies a source of fuel (methanol or solutions of methanol or containing and/or carbonaceous compound or mixture of such compounds to deliver a form of hydrogen) to a fuel cell 18 as a vapor rather than a liquid. The fuel cartridge 12 includes a membrane, generally denoted as 44, which partitions a liquid phase of the fuel to a vapor phase that can be delivered to an egress of the fuel cartridge 12 and into the fuel cell 18. Embodiments of the membrane 44 are described in FIGS. 2A-2E below. Although a fuel cartridge is described, other embodiments of a fuel container are included such as a reservoir 13 as shown in FIG. 1B. In that instance, the fuel reservoir 13 would include membrane 44 and be arranged to either receive fuel from the fuel cartridge 12 having the membrane 44 or be replenished with liquid fuel directly from a cartridge 12 or via a non-fixed source of the fuel, such as by pouring liquid fuel into the reservoir 13.

In some embodiments the fuel cell 18 is a direct methanol fuel cell (DMFC). Optionally, the interconnect 16 interfaces either a battery source of power, e.g., primary or secondary, e.g., rechargeable batteries (not shown) or the fuel cartridge 12. Such an interconnect 16 can distinguish between a fuel cartridge and a battery and provides a convenient technique to allow a fuel cell-powered device to operate under battery power in situations where a fuel cartridge is temporarily unavailable. Device 10 can be any type of portable device. Non-limiting examples include a mobile phone, portable computer or audio/video device.

Figure 2A:
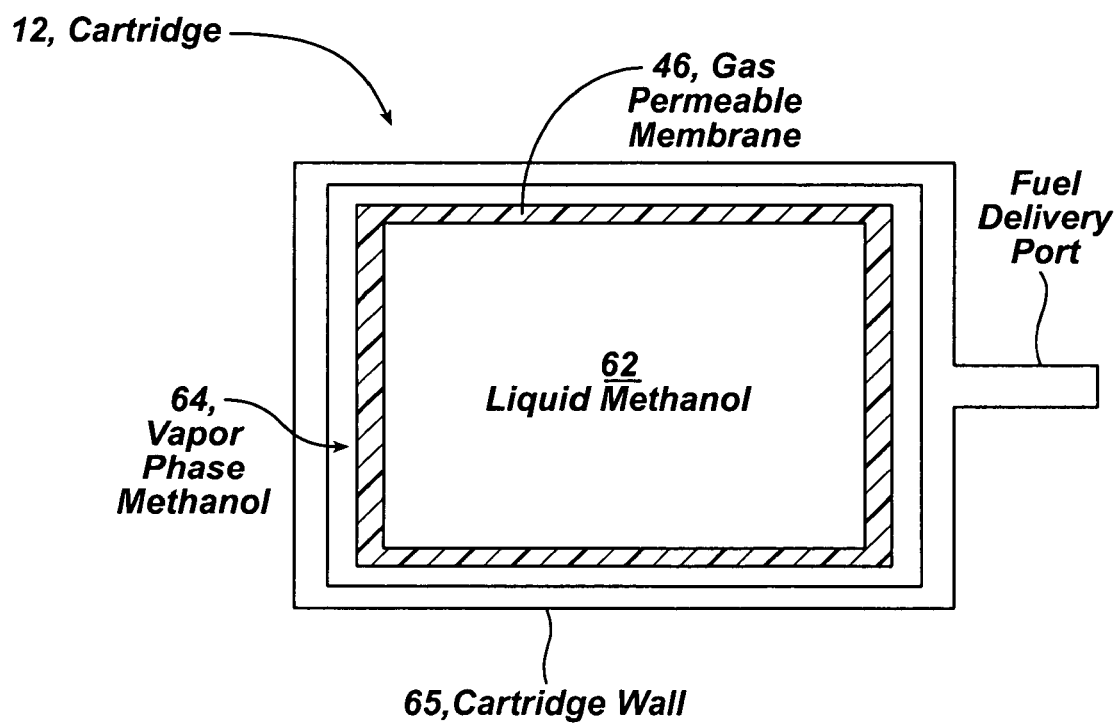
Figure 2C:
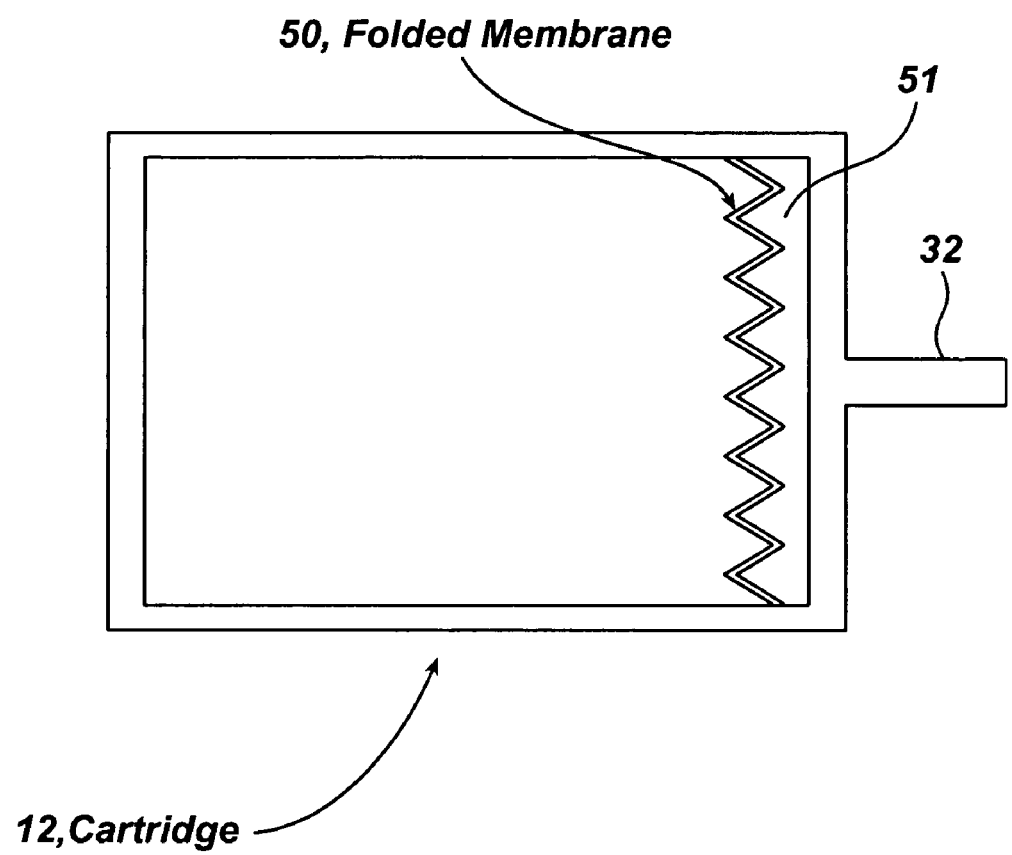

Referring to FIGS. 2A-2C, a fuel cartridge 12 has a fuel delivery interface, that is complementary to the interconnect 16 (FIG. 1), including an egress port 32, as shown. The fuel cartridge 12 includes a mechanism to enhance the rate of delivery of fuel in a vapor state to fuel cells, via use of a surface area-enhanced planar vaporization membrane 44 residing in the fuel cartridge 12, which supplies fuel to the direct methanol fuel cell (DMFC).

As shown in FIGS. 2A-2C, the cartridge outlet can be an egress port. One benefit to a narrow egress is that the cartridge 12 could be more amenable to additional functionality, such as being easily inserted or removed from a device without significant loss of fuel. Another advantaged of a narrow opening is that optional resistive heating could be more finely controlled with a narrow egress (as discussed below). A pinching mechanism, for example could also be used to further restrict flow if desired.

Another approach to the egress port is as an open cavity that separates the cartridge 12 from the fuel cell anode (not shown). An open cavity outlet would not disadvantageously restrict vapor diffusion to the anode, as could happen with a narrow egress. The open cavity outlet could be approximately as wide as the cartridge 12 to allow maximum transport to the anode of the DMFC. Thus, the cartridge 12 could have a temporary cover or the like covering the opening, which is removed during use. In some embodiments, the cartridge 12 could have a portion of the membrane 44 disposed across the opening in the cartridge 12. In general, a large opening is preferred.

The membrane 44 can be fabricated from a variety of polymer materials, including polyurethanes, silicones, poly (trimethylsilylpropyne), and others. Fabrication of the polymer can include introducing microporosity to govern the vaporization process (via a vaporization mechanism) or a dense membrane structure. The membrane can also be fabricated from a sintered metal disc, coated or uncoated with polymer, to achieve a similar vaporization performance.

Different surface area enhanced planar vaporization membranes 44 to enhance and stabilizing the rate of fuel delivery are shown in FIGS. 2A-2E including a polymer membrane 46 disposed about a substantial portion of an interior perimeter of the fuel cartridge 12 to provide a high surface area membrane. FIG. 2B shows a composite membrane 48 comprised of multiple layers or folds of polymer membrane to increase vapor permeation surface area. A membrane 50 can be arranged as a series of folds such as shown in FIG. 2C. FIGS. 2D and 2E show another technique where a polymer membrane 52 is provided with macroscopically irregular (shown) or microscopically (not shown) roughened membrane surfaces to increase the effective membrane surface area for vaporization.

Referring to FIG. 2A, a gas permeable membrane 46 is shown. The gas permeable membrane 46 spaces a liquid source of methanol 62 from a vapor phase 64 of methanol. Vapor occupies the interstitial volume between the membrane 46 and interior walls of the cartridge 12. Rather than use the membrane in planar geometry at the egress port 42, the membrane 46 is chosen to surround the fuel volume and is disposed about an interior portion of the wall 65 of the fuel cartridge 12 enabling increased membrane area, and enhanced delivery rate of methanol in a vapor phase to the egress port 42, for a given cartridge or reservoir size. The rate of fuel delivery is proportional to the surface area of the planar membrane 46. The membrane 46 augments the rate of fuel delivery in a vapor phase and can be used with regular or compact fuel reservoir or fuel cartridge systems to provide high rates of methanol fuel vapor to high power DMFC powered devices.

Referring to FIG. 2B, a multilayer membrane 48 includes a series of layers 48a or folds of polymer membrane disposed about a periphery of the cartridge 12 to increase membrane surface area. An example of the multilayer membrane 48 as wound-cell includes vaporization membrane 48a disposed over a first surface of a substrate 48b of porous material that holds methanol in a liquid state within pores of the material to enable the liquid methanol to migrate to the membrane 48a and convert to a vapor phase. The membrane is fabricated from one of a variety of polymer systems, including polyurethanes, silicones, poly(trimethylsilyl-propyne), and other polymeric compositions, including composites. Fabrication of the polymer can include introducing microporosity to govern the vaporization process (via a vaporization mechanism) or a dense membrane structure.

The membrane 48 can also be fabricated from a sintered metal disc, coated or uncoated with polymer, to achieve a similar vaporization performance. The substrate 48a is comprised of one of a variety of polymer systems, including polyethylene, polypropylene, nylon, polyurethane, or other analogous polymers or composites of one or more of these polymers. The substrate 48a can also be fabricated from a sintered metal form, coated or uncoated with polymer, to achieve a similar performance.

In some embodiments the material of substrate 48a can have further qualities of a "sponge-like" material. An opposite surface of the sponge material 46b is coated with a methanol-impermeable layer 48c, which can be fabricated from materials such as a cross-linked rubber, a polymer/inorganic composite, a surface treated material such as surface fluorinated high density polyethylene, or other methanol-impermeable material.

This three-layer arrangement 48a-48c can be wound and placed into a cylindrical container that comprises the cartridge 12, with an array of gaps between the vaporization membrane 48a and the methanol-impermeable layer 48c providing a path for transporting a high flux of methanol vapor to an anode chamber in the fuel cell. This multilayer membrane 48 can provide a very high flux of methanol vapor from a relatively compact fuel reservoir or fuel cartridge 12. The three-layer arrangement 48a-48c can also be arranged as a series of planar layers and disposed in housings of various shapes and in various configurations, such as disposed about a periphery of the housing, at the egress port of the housing in prismatic shaped cells as in FIG. 4 and so forth.

Various intermediate arrangements between the high surface area of a wound-cell arrangement (FIG. 2B) and the rectangular, liquid-fuel-surrounding membrane (FIG. 2A) are possible. For instance, intermediately dense folded membrane 50 such as shown in FIG. 2C can balance high fluxes obtained in the multilayer configuration and the low membrane volume (i.e., high fuel energy density) of option (FIG. 2A). The gas permeable membrane 50 would extend between interior walls of the fuel cartridge 12 providing a vapor chamber 51 adjacent the egress port 32 of the fuel cartridge 12.

Referring to FIGS. 2D, 2E, another approach to provide a rate enhancement polymer membrane 52 is by providing a random or patterned roughening of the membrane surface (FIG. 2E). The gas permeable membrane 52 is disposed between interior walls of the fuel cartridge 12 and provides a vapor chamber 51 adjacent the egress port 32 of the fuel cartridge 12. The roughening can be on one or both sides of the membrane. One side of the membrane (commonly the vapor side) may limit the permeation rate. It is preferable to enhance the permeation-rate-limiting side of the membrane.

While room temperature vapor phase delivery of methanol to the anode of a fuel cell using a passive, a gas permeable membrane placed parallel to and overlapping the anode layer in the fuel cell can work well for low power (<3 W) DMFC systems) such an approach may not provide sufficient methanol vapor flux to sustain higher power operation. This is due to fundamental limitations in the membrane-enabled vaporization process. The flux of methanol per unit area of membrane is sufficient to maintain oxidation of methanol at reasonable rates for a similar area of the anode. However, above a power range of several Watts, the area of the membrane needs to grow unreasonably large to maintain the methanol flux needed to sustain fuel cell operation at higher power. A fuel cartridge with the geometric dimensions needed to provide the flat membrane area for higher power operation is not convenient for consumer use. In addition, large membranes can be mechanically unstable and have a higher likelihood of mechanical failure over time. Dependent upon operating point and choice of membrane material, an example power range of, e.g., 1 W could require a membrane area of 0.7 cm$^2$, whereas a 5 watt application could require a membrane area of 3.3 cm$^2$. At 3.3 cm$^2$ and higher this becomes impractical for many consumer applications because it requires a very large membrane surface area.

Localized heating can be used in conjunction with the above approaches, either via a resistive element that is disposed in the cartridge or by use of heat generated from the electronic device.

The approaches described above result in an augmentation of the effective surface area of the membrane arrangement generally 44 (and thus an overall rate of vapor permeation) over a fixed geometric area. An enhanced membrane 44 disposed in a fuel cartridge or fuel reservoir provides fuel delivery as a vapor to fuel cells at a rate proportional to the enhanced surface area of the membrane. The enhanced surface area membrane permits compact fuel reservoir or fuel cartridge systems that can deliver a vapor phase of methanol fuel at higher rates to enable higher power DMFC systems. Such an approach also allows the fuel cell to operate without a need for pumps or other active controls to maintain low methanol activity in the anode.

Figure 3:
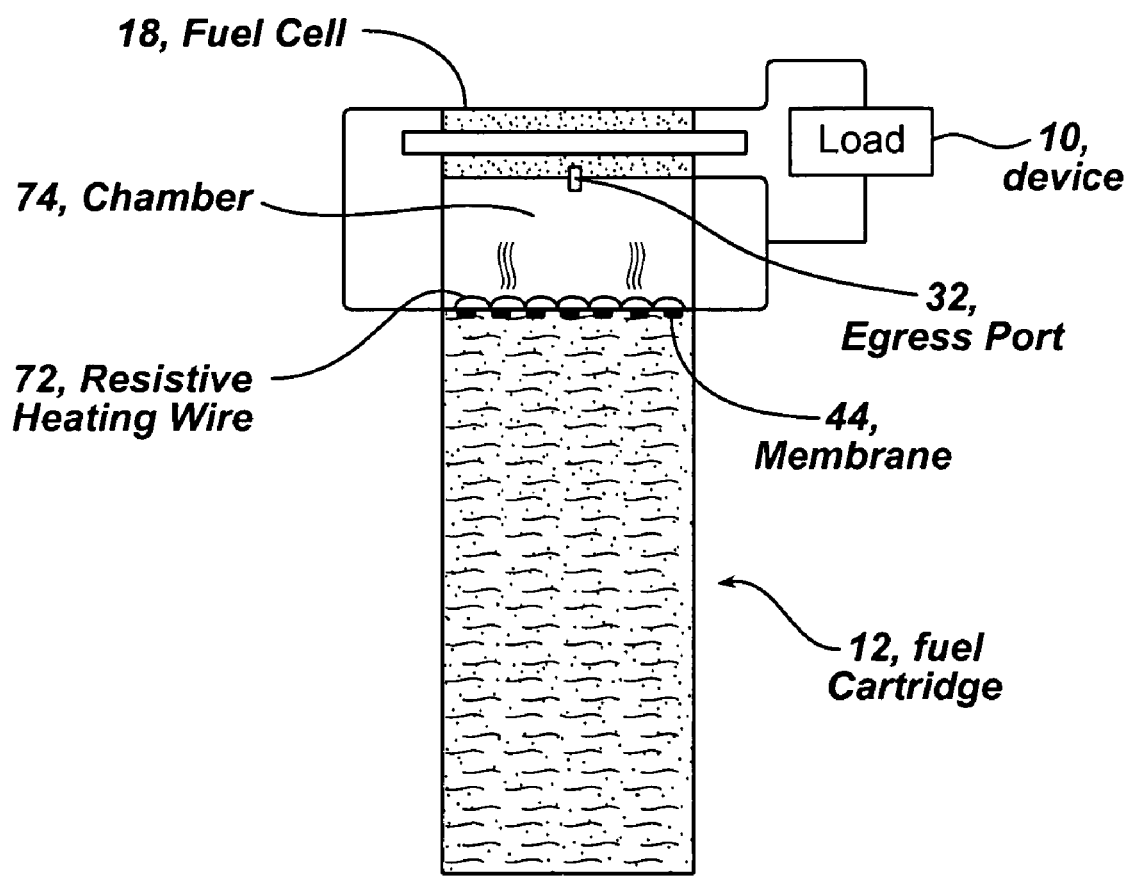
FIG. 3 is a diagram depicting a fuel cartridge having a local heating arrangement.

Referring to FIG. 3, a resistive heating element 72 is disposed at a vaporization membrane interface 44 to enhance vapor fuel delivery, as shown. The rate of vaporization increases significantly with increases in temperature. The vaporization membrane arrangements described in FIGS. 2A-2D can use the heating element 72 as a localized heat source to increase temperature and hence rate of vaporization. The heating element 72, illustrated in FIG. 3 is disposed electrically in parallel with the primary load (device 10) and is powered by a small fraction of the fuel cell electrical output to provide a net boost in output power.

One example of the heating element 72 is a wire, e.g., a coiled wire having a relatively high resistivity characteristic. A typical resistivity characteristic for the heating element 72 as a wire is in a range of 10 to 1M ohms/cm. The heating element 72 can be comprised of a relatively high resistivity material such as Tungsten. Other materials that can be used include nickel/chrome alloys and others. The high resistivity materials can be coated with a polymer or a precious metal to provide protection against erosion and contamination of the fuel cell. The resistive element 72 is disposed in thermal communication with one of the vaporization membrane 44 arrangements (e.g., any of the embodiments in FIGS. 2A-2E, or other configurations).

The membrane 44 and resistive element 72 provide a vapor chamber 74, e.g., a space between the liquid fuel 76 with or without the egress port 32 of the cartridge 12 principally occupied by a vapor phase of the fuel. Preferably, the resistive heating element 72 directly contacts the membrane 44, since as the membrane temperature increase that augments the vaporization rate. The heating element 72 could be on the liquid side or on the vapor side of the membrane 44, or embedded within the membrane 44. The latter two options (vapor side and embedded) provide the advantage of minimizing unnecessary heating of the liquid in the cartridge. Additionally, a sintered metal, for example, could serve as both the membrane material and resistive heater. Heat provided by the resistive element 72 enhances the rate of vaporization across the membrane 44 and can improved overall performance when the device 10 powered by the fuel cell is used in relatively cold ambient temperature environments.

Referring to FIG. 4, another approach 80 can vaporize the liquid fuel, e.g., methanol in a fuel cartridge 12 entirely through a thermal process without the need for a membrane. In this arrangement, power is drawn from the fuel cell (not shown), or supplied through a small battery 82 (button cell, for example) located within or on the fuel cartridge 12 to power a heating mechanism 84. Here, the heating mechanism 84 is schematically shown without connections to the battery, as a wire disposed at the egress port 32 of the fuel cartridge 12.

The fuel cartridge 12 includes a wall or body, here illustrated as a prismatic battery case 86 including the heating element 84, and an internal fuel bladder 90 of a fuel impermeable material, e.g., a rubber and the like that is in contact with a movable wall or piston 88 in the interior of the fuel cartridge 12. A spring 89 applies force to the wall. Guides (not shown) can be used to guide the wall or piston 88 as it moves along the length of the prismatic case. Liquid fuel, e.g., methanol is disposed in the bladder 90. As liquid is consumed from the fuel cartridge 12 the pressure in the bladder 90 subsides, allowing the force produced by the spring 89 to urge the wall or piston 88 against the bladder 90 to insure that methanol in the bladder 90 is delivered to the egress port 32 of the fuel cartridge 12. The wall/piston 88 and spring 89 insure uniform delivery of liquid from the bladder 90 independent of case orientation.

The egress port 32 can have a fuel valve integrated with a vaporization heating unit. One embodiment as shown in FIG. 4A, includes a resistive heating element(s) that is disposed in a constricted area within the valve assembly (not shown). In some embodiments the heat element 84 could be dispensed with. Power for the resistive heaters can be obtained by the button cell battery within or supported on the fuel cartridge, or from the fuel cell power source via external leads (not shown). Other embodiments are possible.

Referring to FIG. 4A, an example of a fuel valve 70 having an integrated vaporization-heating unit is shown. The fuel valve 70 is illustrated as the egress 32 for the embodiment of the cartridge 12 shown in FIG. 4 including membrane arrangement 46. The egress 32 is depicted as a valve 33 having an integrated heating element 73. The valve 33 is supported on the cartridge wall 65 and includes the heating element 73 arranged in any one of a variety of configurations such as disposed in the center of the valve as shown, or disposed about the sidewalls of the valve (not shown) or integrated into the sidewalls (not shown). The heating element is disposed to increase the rate of vaporization across the membrane 46. The valve can have various mechanisms to secure it to a device during use, such as a bayonet connection, threaded connection and so forth.

Figure 5:
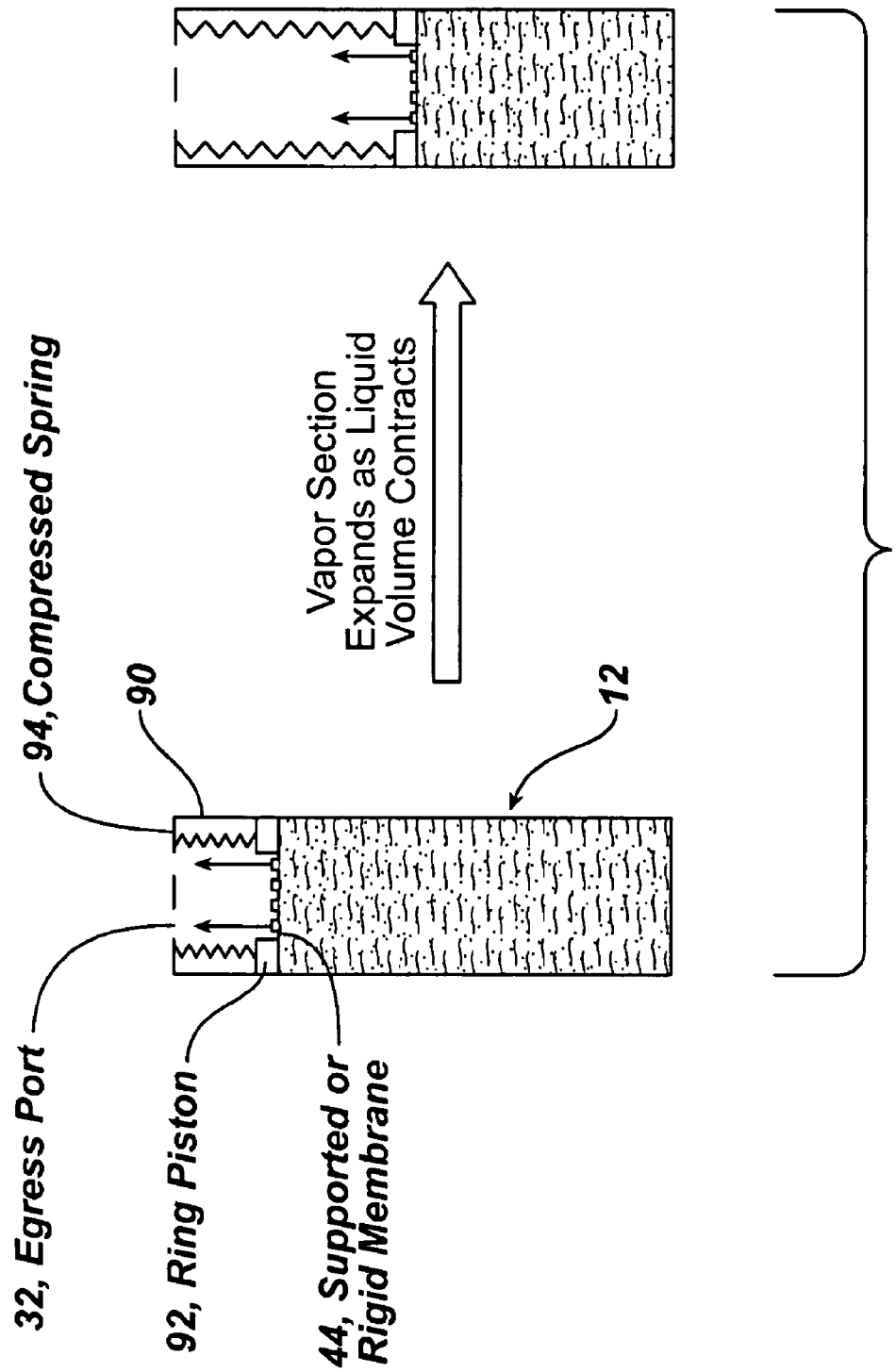
FIGS. 5-7 are diagrams depicting various arrangements for inducing vapor pressure differentials in fuel cartridges.

Referring to FIG. 5, an alternative arrangement to enhance vapor delivery is to provide a reduced pressure on the permeate (vapor) side of a vaporization membrane 44 and take advantage of the principle that a pressure decrease (similar to a temperature increase) can boil or evaporate a liquid. Stated differently, a reduced pressure downstream incrementally decreases a vapor concentration of fuel, thus increasing a driving force for permeation of the fuel from the liquid phase to the vapor phase.

One mechanism to induce a reduced pressure is to increase volume on a vapor side 90 of the cartridge 12. The vapor side of the cartridge 12 includes a vapor permeable piston 92 that is urged against liquid 96 in the cartridge 12 by one or more spring mechanisms 94 disposed between the piston 92 and interior regions of the cartridge 12 adjacent the egress port 32 of the cartridge 12. One embodiment of the piston 92 is as a vaporization membrane 44. A wire mesh or rigid micro- or macro-porous layer can mechanically support a flexible vaporization layer, (e.g., a fluorocarbon polymer, polyethylene, polypropylene, polycarbonate, polyimide, polysulfone, polysulfide, polyurethane, polyester, cellulose, or paper). The ring piston 92 provides a leak-proof seal while sliding along the cartridge wall. The ring outer diameter nests barely within the cartridge diameter. Also, the ring and adjacent cartridge wall are preferably made of or coated by a fuel repellent and fuel impermeable material to minimize liquid flow leakage into the vapor side. Such a materials or coatings are fluoropolymers, e.g., polytetrafluoroethylene and so forth. In addition for the ring in particular, a sufficiently rigid material is preferred to minimize the ring radial thickness while still providing mechanical stability, allowing for maximum uncovered membrane area.

As the liquid volume is depleted, the vapor side increases in volume since the piston 92 travels further away from the egress port 32 expanding the volume on the vapor side of the cartridge 12. Again, the vaporization membrane 44 contains the fuel in its liquid phase and principally allows only vapor to permeate into the vapor side 90. The mechanical action can be active (e.g. with the force of springs) or passive (e.g., with liquid displacement alone). Passive actuation relies on low friction of the ring piston.

Figure 6:
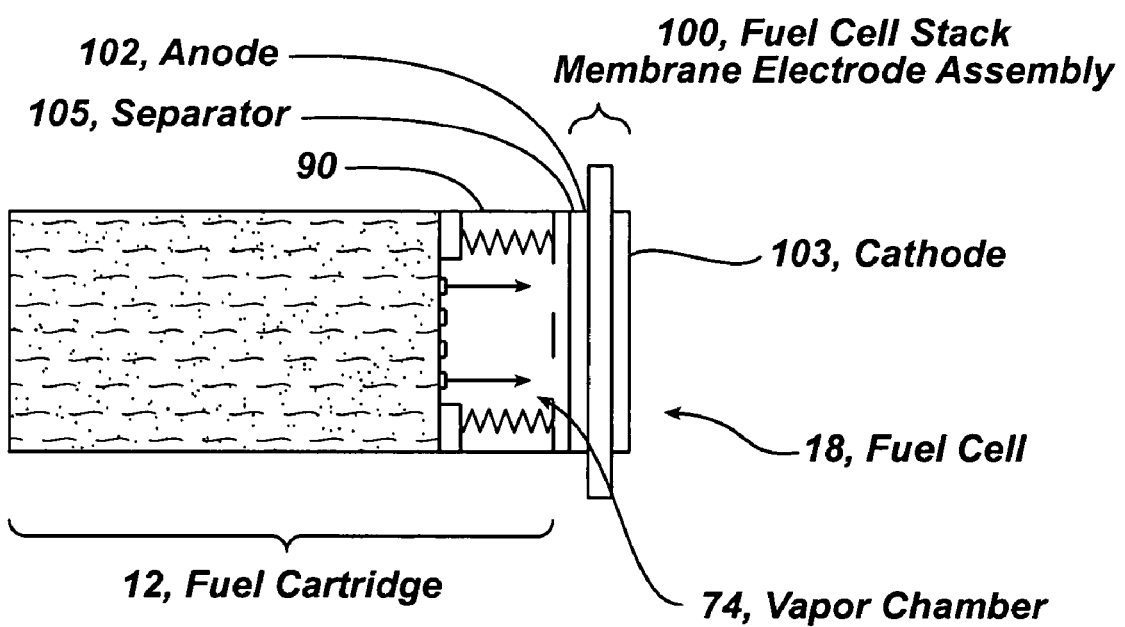

Referring to FIG. 6, fuel cell 18 is shown as a fuel cell stack 100 (a single membrane electrode assembly) having an anode 102 and a cathode 103 spaced by a separator 105. The fuel stack 100 is disposed adjacent the vapor side 90 of the fuel cartridge 12. Vapor from the fuel cartridge 12 directly flows to an anode electrode 102 of the fuel cell 18.

The volume of expansion induced in the vapor side 90 of the cartridge 18 can be made greater than the contraction volume of the liquid fuel phase by permitting additional expansion of the volume of the vapor chamber 74.

Figure 7:
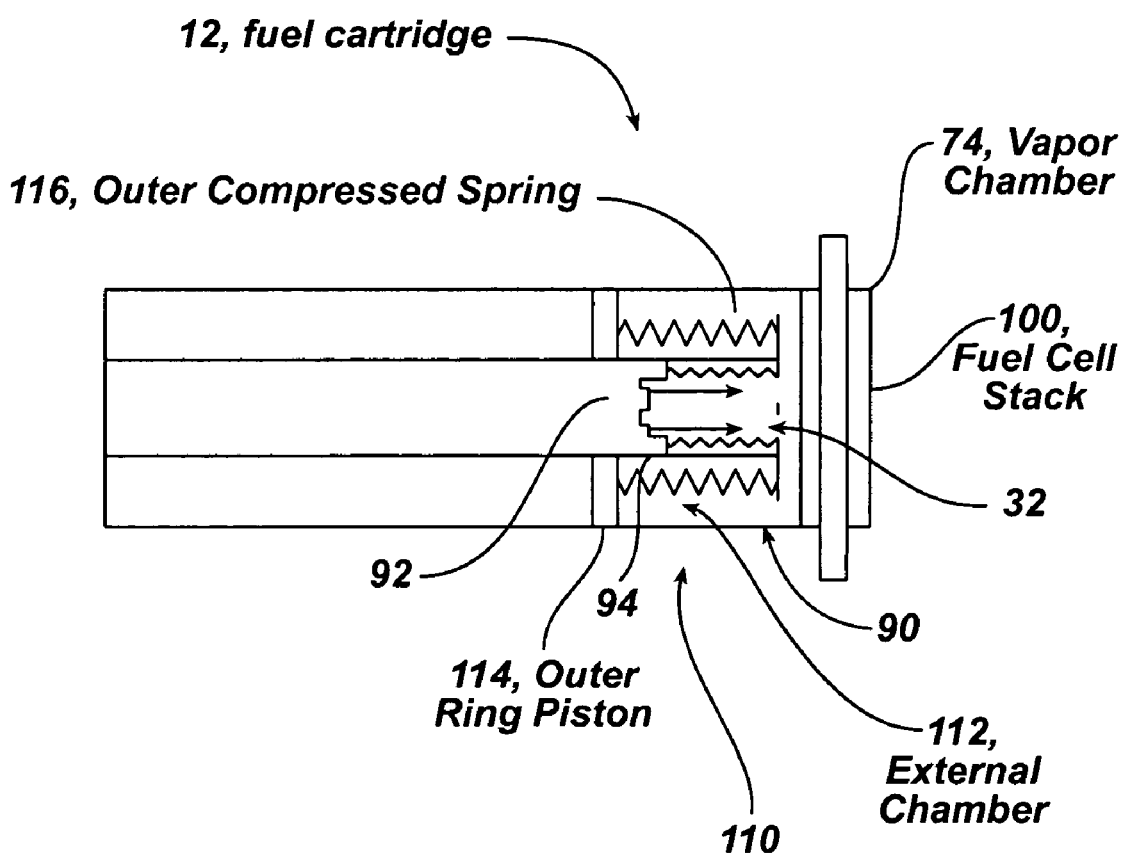

Referring to FIG. 7, an arrangement 110 to enhance vapor delivery by providing additional volume to the vapor phase chamber 74 is shown. The vapor side 90 of the fuel cartridge 12 including piston 92 and internal spring 94, as in FIG. 5, is augmented with an arrangement 10 to increase the effective volume of the vapor chamber 74 of the cartridge 12. Additional volume is provided to the vapor phase chamber 74 by an external chamber 112 that is disposed around the outer surface of the cartridge 12 and which is in vapor communication with the internal vapor chamber 74. The external chamber 112 has a vapor impermeable piston 114 that is urged against vapor in the outer chamber 112 in the cartridge 12 by one or more outer spring mechanisms 116 disposed between the vapor impermeable piston 114 and the fuel cell 18, adjacent the egress port 32 of the cartridge 12. As the vapor pressure increases, the increase in vapor pressure causes the piston 114 to move in a manner that increases the volume of the external chamber 114.

One embodiment of the vapor impermeable piston 114 is a solid sealing material or metal coated with sealing material such as polyfluoroalkenes, fluoroelastomers, and rubbers, e.g., silicone, fluorosilicone, nitrile neoprene, natural, or polyurethane. A metal core can be included in the ring piston to provide mechanical rigidity. The external chamber 114 may be an expandable gas volume of fuel vapor, anode reaction product, and possibly inert gas (such as nitrogen). The contracting volume opposing the external chamber 114 (i.e., on the opposite side of the ring piston) is preferably vented to an external ambient to avoid pressure buildup inside the external chamber 114.

The expansion may be independent of liquid depletion as shown here with independent springs. Alternatively, the outer ring piston may be connected mechanically (or magnetically if desired) to slide in parallel with the inner piston movement with liquid depletion. Furthermore, the vapor side cavity may be shaped (e.g., cone-like) to allow for an increasing volume expansion as the fuel depletes. Vapor-side expansions greater than the liquid contraction do have the disadvantage of requiring additional overall volume.

For control of fuel delivery, the membrane may be synthesized or processed (by localized compression or elongation, for example) to have variable permeability with surface position. For instance, if a non-uniform distribution of fuel to the anode is provided, a position-variable permeability (and thus variable fuel flux) can be provided to even fuel distribution.

Figure 8:
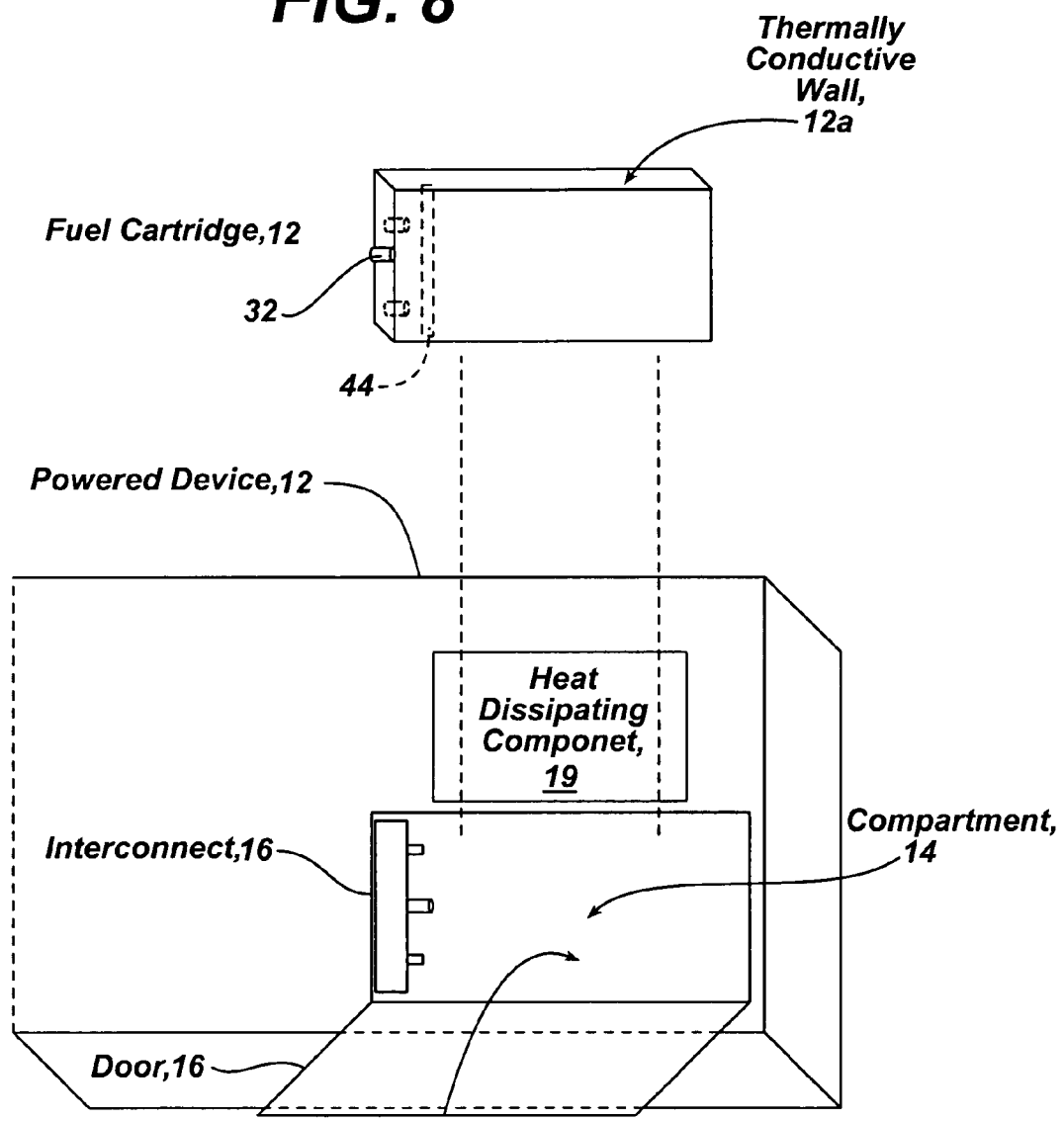
FIG. 8 is a diagram depicting a powered device and construction details of the fuel cartridge.

Referring to FIG. 8, the portable powered, electronic device 10 depicted in FIGS. 1A and 1B, is shown with a housing 11, having a compartment 14 that houses an energy source, e.g., one of the fuel cartridges 12 as described above. The interconnect 16 interfaces the fuel cartridge 12 that supplies a source of fuel (a form of hydrogen) to the fuel cell (not shown) as a vapor rather than a liquid. The fuel cartridge 12 includes vaporization membrane 44 that partitions a liquid phase of the fuel to a vapor phase that can be delivered to an egress 32 of the fuel cartridge 12. In some embodiments of the fuel cartridge 12 the walls or at least portions of a wall, e.g., 12a of the fuel cartridge 12 are fabricated from a thermally conductive material, typically a metal. Such an embodiment of a fuel cartridge 12 uses the walls of the fuel cartridge as a heat sink for heat generated by small portable devices like a lap top computers. The metal or conductive material or at least those portions of the cartridge comprised of the conductive material are disposed in thermal communication with a heat-dissipating component 19 within the device 10. The fuel cartridge is disposed in close proximity to heat dissipating component 19, e.g., a CPU in a laptop, or within an airflow pattern associated with micro fans (not shown) used in some portable power devices.

The fuel cartridge 12 draws heat away from heat dissipating component 19 in the electric device 10. Heat will be transferred across the thermally conductive wall of the fuel cartridge 12 and will provide a concomitant increase in the pressure of methanol vapor within the cartridge 12. The increase in vapor pressure enables faster vapor flow through the separator membrane 44. This technique provides a fuel cartridge 12 with a passive system that provides enhanced methanol vapor pressure and hence greater energy delivery to the fuel cell. In addition, the use of the fuel cartridge 12 as a heat sink may significantly reduce the need for a cooling fan (also an energy drain on the device) to enhance device efficiency and increase run time of the device. The exact configuration of the fuel cartridge 12 could be dependent on the configuration of the device 10, the amount of heat generated by the device and the presence or absence of a fan.

Configurations of the fuel cartridge 12 can include, a metal or other thermally conductive material wall 12a that is combined with remaining, thermally insulating walls 12b of the fuel cartridge 12b. The thermally conductive walls 12a would be disposed in direct contact with the heat source 19 in the device or at least in close proximity to the heat source 19, or in an air flow path (not shown) that is used to remove heat from the heat source 19. Alternatively, the thermally conductive can be an upper portion of the fuel cartridge 12 adjacent the fuel egress port 32 and in general alignment with the vapor chamber provided in the cartridge. In some embodiments, the housing of the fuel cartridge 12 can be completely comprised of metal or other thermally conductive material. The fuel cartridge can take various shapes including the prismatic type depicted, cylindrical types depicted in FIGS. 1, 2A-2D and so forth.

Figure 9:
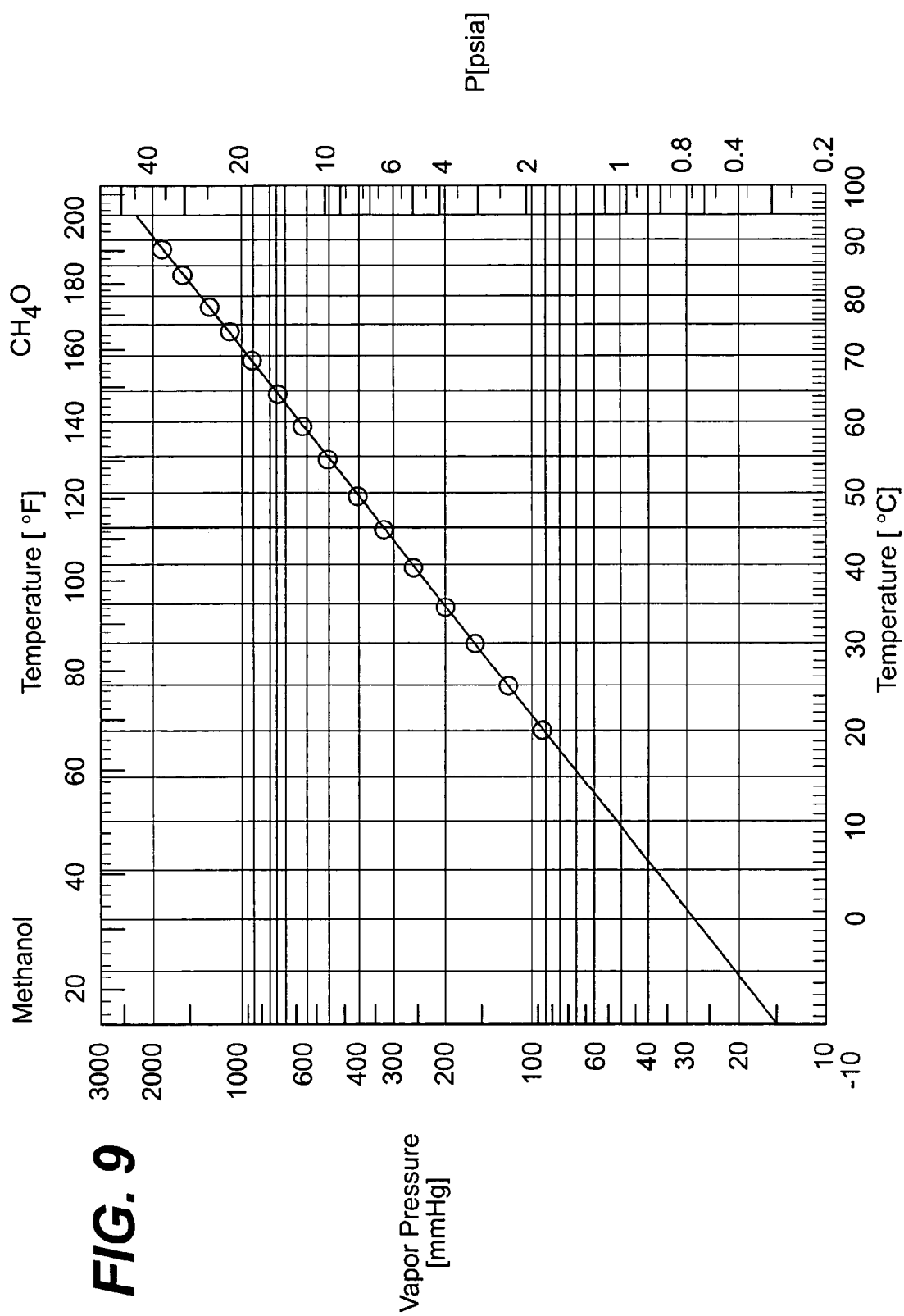
FIG. 9 is a plot of methanol vapor pressure with temperature changes.

Referring to FIG. 9, a plot that depicts changes in methanol vapor pressure with temperature changes is shown.

The cartridge 12 is particularly useful with electrical components that generate a large amount of heat during operation. The cartridge 12 would have features that take advantage of heat generating surfaces in the device ideally being placed in direct contact with the fuel cartridge. In some embodiments, the cartridge can be configured as a fuel reservoir and supplement or replace heat sink elements on heat dissipating devices. The cartridge containing the methanol liquid serves as a vapor phase fuel delivery system and a heat sink for the device 10. Thus, the fuel cartridge acting as a heat sink helps to remove heat from the device 10, while the heat generated increases the vapor pressure of the methanol vapor and therefore increases the amount of vaporized fuel that can be delivered by the membrane surface to the fuel cell. The fuel cartridge can include external and/or internal fins to increase heat transfer to the methanol fuel.

In pervaporation, the fuel is vaporized as it moves through the membrane, rather than being vaporized in advance of the membrane. Some embodiments of the membrane can be considered pervaporation membranes whereas; others can be considered vaporization membranes. For instance, direct heating without a membrane or in advance of the membrane (vapor-vapor permeation) is a direct vaporization process.

The approaches described above in FIGS. 2A-2E result in an augmentation of the effective surface area of the membrane arrangement generally 44 (and thus an overall rate of vapor permeation) over a fixed geometric area. An enhanced membrane 44 disposed in a fuel cartridge or fuel reservoir provides fuel delivery as a vapor to fuel cells at a rate proportional to the enhanced surface area of the membrane. The arrangements depicted in FIGS. 3-9 increase vaporization rate exponentially with increases in the temperature of the liquid fuel source. The enhanced surface area membrane and/or heating or pressure reducing mechanisms permit compact fuel reservoir or fuel cartridge systems that can deliver vapor phase of methanol fuel at higher rates to enable higher power DMFC systems. Such an approach also allows the fuel cell to operate without a need for pumps or other active controls to maintain low methanol activity in the anode.

A number of embodiments of the invention have been described. Nevertheless, it will be understood that various modifications may be made without departing from the spirit and scope of the invention. For example, rather than being a replaceable fuel cartridge, the arrangement can be a permanently attached fuel reservoir that can be replenished periodically through a refilling mechanism. In addition, a fuel cartridge could be used to provide vapor phase methanol fuel to a fuel cell assembly that has a permanently attached fuel reservoir containing a second membrane system. In such a system, the second membrane regulates the flux of vapor phase methanol to the fuel cell in two-stage a manner that may provide more control of vapor delivery than that of a single-stage vaporization approach. The techniques thus apply to a fuel cell assembly with a permanently attached fuel reservoir, or replaceable fuel cell cartridge, or both. Accordingly, other embodiments are within the scope of the following claims.

What is claimed is:

1. A fuel cartridge that supplies a source of fuel to a direct methanol fuel cell, the fuel cartridge comprising:
   a housing;
   a fuel egress port supported by the housing; and
   a composite membrane residing in the housing of the fuel cartridge comprising:
      a porous substrate;
      a polymer membrane disposed over a first surface of the porous substrate; and
      a coating of a methanol-impermeable material disposed over an opposite surface of the substrate.

2. The fuel cartridge of claim 1 wherein substrate is provided to hold methanol in a liquid state within the porous material to enable liquid methanol to migrate to the polymer membrane and convert to a vapor phase.

3. The fuel cartridge of claim 1 wherein the composite membrane is wound into a cylindrical shaped element.

4. The fuel cartridge of claim 1 wherein gaps between the polymer membrane and the methanol-impermeable coating providing a path for transporting a high flux of methanol vapor to the egress port.

5. The fuel cartridge of claim 1 wherein a plurality of the composite membranes are disposed in the fuel cartridge.

6. The fuel cartridge of claim 1 wherein a plurality of the composite membranes are disposed in the fuel cartridge and wound into a cylindrical shaped element.

7. The fuel cartridge of claim 1 wherein the substrate is polyethylene, polypropylene, nylon, polyurethane, or other analogous polymers or composites of one or more of these polymers.

8. The fuel cartridge of claim 1 wherein the polymer membrane is a polyurethane material.

9. The fuel cartridge of claim 1 wherein the polymer material is selected from the group consisting of polyurethanes, silicones, poly(trimethylsilyl-propyne), polymeric compositions, and composites.

10. The fuel cartridge of claim 8 wherein the polymer has a microporosity characteristic to govern vaporization.

11. The fuel cartridge of claim 1 wherein the membrane is a sintered metal disc coated with a polymer.

12. The fuel cartridge of claim 1 wherein the methanol-impermeable coating is a cross-linked rubber, a polymer/inorganic composite, a surface fluorinated high density polyethylene, or other methanol-impermeable material.

13. The fuel cartridge of claim 1 wherein the substrate is polyethylene, polypropylene, nylon, polyurethane, or other analogous polymers or composites of one or more of these polymers; the polymer membrane is a polyurethane, a silicone, poly(trimethylsilyl-propyne), or composites of polyurethanes, silicones, poly(trimethylsilyl-propyne) and the methanol-impermeable coating is a cross-linked rubber, a polymer/inorganic composite, a surface treated material such as surface fluorinated high density polyethylene, or other methanol-impermeable material.

14. A composite membrane comprising:
a porous substrate;
a polymer membrane disposed over a first surface of the porous substrate; and
a coating of a methanol-impermeable material disposed over an opposite surface of the substrate.

15. The membrane of claim 14 wherein substrate is provided to hold methanol in a liquid state within the porous material to enable liquid methanol to migrate to the polymer membrane and convert to a vapor phase.

16. The membrane of claim 14 wherein the composite membrane is wound into a cylindrical shaped element.

17. The membrane of claim 14 wherein gaps between the polymer membrane and the methanol-impermeable coating providing a path for transporting a high flux of methanol vapor.

18. The membrane of claim 14 wherein the substrate is polyethylene, polypropylene, nylon, polyurethane, or other analogous polymers or composites of one or more of these polymers.

19. The membrane of claim 14 wherein the polymer material is selected from the group consisting of polyurethanes, silicones, poly(trimethylsilyl-propyne), polymeric compositions, and composites.

20. The membrane of claim 14 wherein the polymer has a microporosity characteristic to govern vaporization.

21. The membrane of claim 14 wherein the membrane is a sintered metal disc, coated with a polymer.

22. The membrane of claim 14 wherein the methanol-impermeable coating is a cross-linked rubber, a polymer/inorganic composite, a surface fluorinated high density polyethylene, or other methanol-impermeable material.

23. The membrane of claim 14 wherein the substrate is polyethylene, polypropylene, nylon, polyurethane, or other analogous polymers or composites of one or more of these polymers; the polymer membrane is polyurethanes, silicones, poly(trimethylsilyl-propyne), or composites of polyurethanes, silicones, poly(trimethylsilyl-propyne) and the methanol-impermeable coating is a cross-linked rubber, a polymer/inorganic composite, a surface treated fluorinated high density polyethylene.

\* \* \* \* \*